(12) United States Patent
Nakayama et al.

(10) Patent No.: US 7,213,110 B2
(45) Date of Patent: May 1, 2007

(54) DESTAGING METHOD FOR STORAGE APPARATUS SYSTEM, AND DISK CONTROL APPARATUS, STORAGE APPARATUS SYSTEM AND PROGRAM

(75) Inventors: Shinichi Nakayama, Chigasaki (JP); Yutaka Takata, Ninomiya (JP); Naotaka Kobayashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 79 days.

(21) Appl. No.: 10/456,256

(22) Filed: Jun. 6, 2003

(65) Prior Publication Data

US 2004/0019740 A1  Jan. 29, 2004

(30) Foreign Application Priority Data

Jul. 25, 2002  (JP)  ............... 2002-217186

(51) Int. Cl.
  *G06F 12/00* (2006.01)
(52) U.S. Cl. .................. 711/143; 711/154; 711/162; 709/219
(58) Field of Classification Search .................. None
See application file for complete search history.

(56) References Cited

U.S. PATENT DOCUMENTS

| | | | |
|---|---|---|---|
| 5,404,500 A | | 4/1995 | Legvold et al. |
| 5,542,066 A | | 7/1996 | Mattson et al. |
| 5,596,736 A | | 1/1997 | Kerns |
| 5,748,985 A | * | 5/1998 | Kanai .................. 711/130 |
| 5,937,433 A | * | 8/1999 | Lee et al. ............. 711/158 |
| 6,192,450 B1 | | 2/2001 | Bauman et al. |
| 6,341,331 B1 | | 1/2002 | McNutt |
| 6,675,264 B2 | * | 1/2004 | Chen et al. ........... 711/141 |
| 6,883,065 B1 | * | 4/2005 | Pittelkow et al. ...... 711/114 |
| 6,931,485 B2 | * | 8/2005 | Aigo .................. 711/113 |
| 2003/0163553 A1 | * | 8/2003 | Kitamura et al. ...... 709/219 |

* cited by examiner

*Primary Examiner*—Brian R. Peugh
(74) *Attorney, Agent, or Firm*—Mattingly, Stanger, Malur & Brundidge, P.C.

(57) ABSTRACT

A destaging method is provided for destaging a storage apparatus system comprising a disk control apparatus that functions as a data storage unit and is provided with disk apparatuses and a first cache memory, and an information processing apparatus that is connected to the disk control apparatus and provided with a second cache memory. The method includes a first step, in which upon an interruption of the functions of the disk control apparatus as the storage unit for the information processing apparatus, the information processing apparatus transfers to the first cache memory data scheduled to be written onto the disk apparatuses and that is currently stored in the second cache memory, and a second step, in which the disk control apparatus manages data to be stored in the disk apparatuses by dividing the data into a plurality of management groups and, when all data that belong to one of the management groups remained in the second cache memory and scheduled to be written onto the disk apparatuses are ready in the first cache memory, beginning writing onto the disk apparatuses the data that belong to the one of the management groups remaining in the first cache memory are scheduled to be written.

5 Claims, 9 Drawing Sheets

Fig. 2

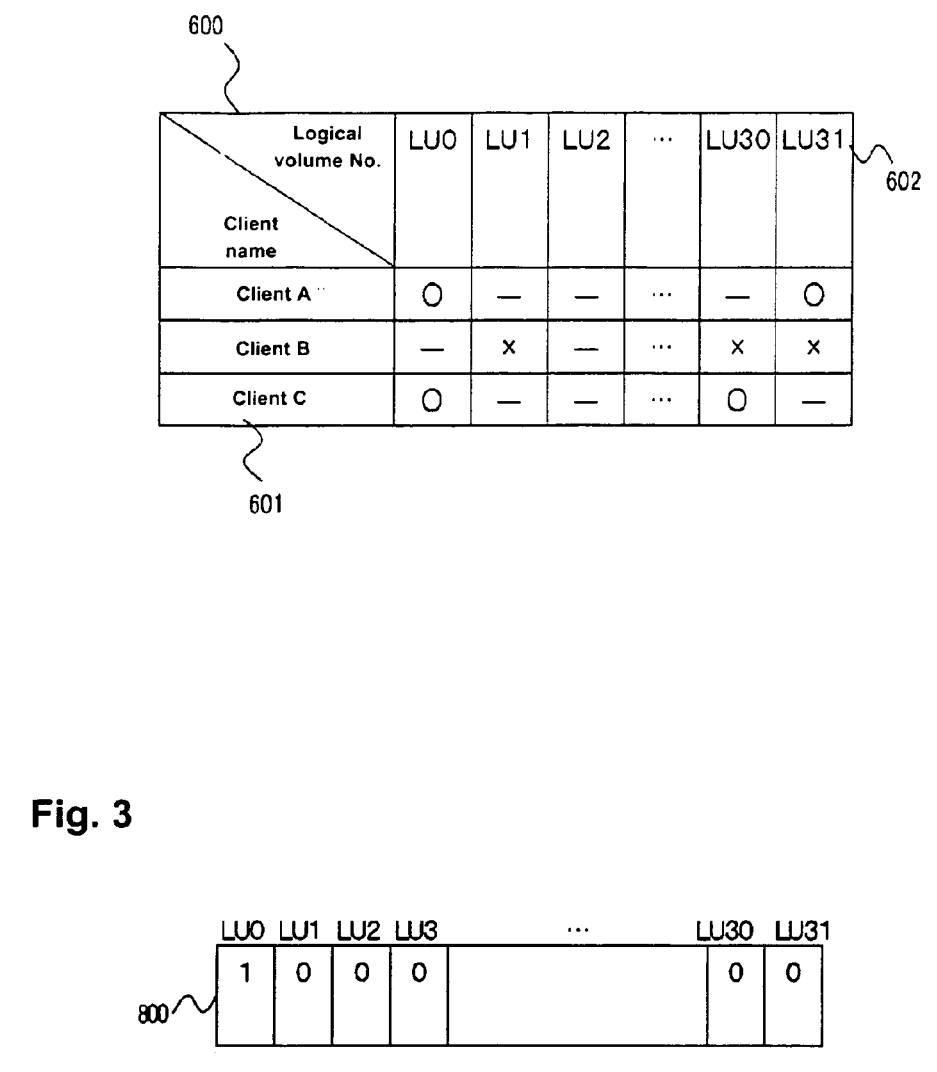

| Logical volume No.<br>Client name | LU0 | LU1 | LU2 | ... | LU30 | LU31 |
|---|---|---|---|---|---|---|
| Client A | ○ | — | — | ... | — | ○ |
| Client B | — | × | — | ... | × | × |
| Client C | ○ | — | — | ... | ○ | — |

| LU0 | LU1 | LU2 | LU3 | ... | LU30 | LU31 |
|---|---|---|---|---|---|---|
| 1 | 0 | 0 | 0 | | 0 | 0 |

800

DESTAGING METHOD FOR STORAGE APPARATUS SYSTEM, AND DISK CONTROL APPARATUS, STORAGE APPARATUS SYSTEM AND PROGRAM

BACKGROUND OF THE INVENTION

1. Field of the Invention

The present invention relates to a destaging method for a storage apparatus system, as well as to disk control apparatus, a storage apparatus system and a program.

2. Related Background Art

In recent years, the management method used for cache memory in computers has often been the write-back method. This is due to the fact that the write-back method requires less frequent access to disk apparatuses, which can prevent a decline in the processing performance of the computer resulting from disk access penalty. However, since managing the cache memory using the write-back method involves delaying the writing of data onto disk apparatuses, dirty data to be written onto disk apparatuses usually remain in the cache memory.

For this reason, a processing to write onto the disk apparatuses the dirty data remaining in the cache memory (i.e., destaging) must be performed when shutting down the computer.

Destaging must be performed in sequence from upper hierarchy to lower hierarchy in each storage hierarchy within a computer system. This is to make certain that there is no dirty data left in upper hierarchy cache memory. According to conventional technology, the destaging of the lower hierarchy is performed only after the destaging of all upper hierarchy is completed.

However, as the performance of computers continued to improve in recent years, larger capacity cache memories have been mounted on computers, and such cache memories require longer time for destaging.

This becomes a major problem especially when destaging must be performed in an unexpected power outage, for example. This is due to the fact that the time during which power supply is provided by a backup battery mounted on a computer system in power outage situations is limited. If destaging is not completed within the short time during which power is provided by the battery, the dirty data stored in the cache memory will be lost. This can significantly compromise the reliability of the computer system. On the other hand, making certain that the data would not be lost would involve providing a large capacity battery. However, this would not only increase the cost of the computer system, but would also require a large occupying area to mount the battery on the computer.

SUMMARY OF THE INVENTION

In view of the above, the present invention relates to destaging a cache memory in a short time.

In accordance with one embodiment of the present invention, in a destaging method for destaging a storage system having a storage unit with a first cache memory and at least one information processing unit with a second cache memory, the method comprises: a step of managing data to be stored in the storage unit by dividing the data into a plurality of management groups; a first step of transferring to the first cache memory data that is stored in the second cache memory and scheduled to be written onto the storage unit, when an interruption of a data storage function of the storage unit for the information processing unit occurs; and a second step of, when all data that remained in the second cache memory, belong to one of the management groups, and are scheduled to be written onto the storage unit are ready in the first cache memory, starting to write onto the storage unit the data that belong to the one of the management groups, remaining in the first cache memory and scheduled to be written.

In accordance with one embodiment of the present invention, in a method for destaging a storage apparatus system comprising a disk control apparatus that functions as a data storage unit and is equipped with at least one disk apparatus and a first cache memory that temporarily stores input/output data to and from the disk apparatus, and at least one information processing apparatus that is connected to the disk control apparatus and equipped with a second cache memory that temporarily stores data read from the disk control apparatus, the method comprises a first step, in which upon an interruption of the functions of the disk control apparatus as the data storage unit for the information processing apparatus, the information processing apparatus transfers to the first cache memory data that is scheduled to be written onto the disk apparatus and that is currently stored in the second cache memory; and a second step, in which the disk control apparatus manages data to be stored in the disk apparatus by dividing data into a plurality of management groups and, when all data that remained in the second cache memory, scheduled to be written onto the disk apparatus and belong to one of the management groups are ready in the first cache memory, begins writing onto the disk apparatus the data that belong to the one management group, remaining in the first cache memory and scheduled to be written in the disk apparatus.

With such a method in accordance with the embodiment described above, there is no need to wait for the transfer of data stored in all cache memories of upper hierarchy to be completed; instead, once data that belong to a certain management group are ready, destaging of the data can be started. As a result, destaging of the cache memory can be performed in a short time.

Furthermore, in one embodiment of the present invention, the least one disk apparatus may include a plurality of disk apparatuses, and the one of the management groups may correspond to at least one logical volume, which is part of a plurality of logical storage regions organized in storage regions provided by the disk apparatuses.

As a result, once all data that belong to a certain logical volume are ready, destaging of the data can be begun.

In accordance with one embodiment of the present invention, if a notice is issued in the second step from all information processing apparatuses that use a certain logical volume that the transfer in the first step has been completed, destaging of the logical volume can be started.

One embodiment of the present invention relates to a disk control apparatus that functions as a data storage unit and is provided with disk apparatuses and a first cache memory that temporarily stores input/output data to and from the disk apparatuses. In one aspect of the present embodiment, the disk control apparatus comprises a first component that connects to the disk control apparatus at least one information processing apparatus that is provided with a second cache memory to store temporarily data read from the disk control apparatus; a second component for the disk control apparatus to receive from the information processing apparatus data that is scheduled to be written onto the disk apparatuses and is currently stored in the second cache memory, and to store the data in the first cache memory, upon an interruption of the functions of the disk control apparatus as the storage unit for the information processing apparatus; and a third component for the disk control apparatus that manages data to be stored on the disk apparatuses by dividing data into a plurality of management groups and, when all data that remained in the second cache memory, are scheduled to be written onto the disk apparatuses and belong to one of the management groups are ready in the first cache memory, begins writing onto the disk apparatuses the data that belong to the one of the management groups remaining in the first cache memory and scheduled to be written.

Another embodiment of the present invention relates to a storage apparatus system comprising a disk control apparatus that functions as a data storage unit and is provided with disk apparatuses and a first cache memory to store temporarily input/output data to and from the disk apparatuses, and at least one information processing apparatus that is connected to the disk control apparatus and provided with a second cache memory that temporarily stores data read from the disk control apparatus. In one aspect of the present embodiment, the storage apparatus system may comprise a first component for the information processing apparatus to connect to at least one external information processing apparatus having a third cache memory to store temporarily data read from the information processing apparatus; a second component for the information processing apparatus to receive from the external information processing apparatus the data scheduled to be written onto the disk apparatuses and currently stored in the third cache memory, and to store the data in the second cache memory, upon an interruption of the functions of the disk control apparatus as the storage unit for the external information processing apparatus; a third component for the information processing apparatus to begin to transfer to the first cache memory the data scheduled to be written onto the disk apparatuses and is currently remaining in the second cache memory; and a fourth component for the disk control apparatus to manage data to be stored on the disk apparatuses by dividing the data into a plurality of management groups and, when all data that remained in the second cache memory, are scheduled to be written onto the disk apparatuses and belong to one of the management groups are ready in the first cache memory, to begin writing onto the disk apparatuses the data that belong to the one of the management groups, remaining in the first cache memory and scheduled to be written.

In accordance with one embodiment of the present invention, a storage apparatus system may contain the disk control apparatus and the information processing apparatus of the storage apparatus system in one housing.

One embodiment of the present invention relates to a program that enables an information processing apparatus, which is connected to a disk control apparatus that functions as a data storage unit and manages data by dividing data into a plurality of management groups, the disk control apparatus having a disk apparatus and a first cache memory that temporarily stores data to and from the disk apparatus, and which has a second cache memory that temporarily stores data read from the disk control apparatus, to execute: a first step of, upon an interruption of a function of the disk control apparatus as the storage unit for the information processing apparatus, transferring to the first cache memory data scheduled to be written onto the disk apparatus and that is currently stored in the second cache memory; and a second step of issuing a notice indicating that the transfer of data scheduled to be written is completed.

One embodiment of the present invention relates to a program that enables a disk control apparatus, which functions as a data storage unit and comprises disk apparatuses and a first cache memory to store temporarily input/output data to and from the disk apparatuses, to execute a first step, in which upon an interruption of the functions of the disk control apparatus as the data storage unit for the information processing apparatus, the disk control apparatus receives from at least one information processing apparatus that is connected to the disk control apparatus and provided with a second cache memory to store temporarily data read from the disk control apparatus the data that is scheduled to be written onto the disk apparatuses and that is currently stored in the second cache memory, and stores the data in the first cache memory; and a second step, in which the disk control apparatus manages data to be stored on the disk apparatuses by dividing the data into a plurality of management groups and, when all data that remained in the second cache memory, are scheduled to be written onto the disk apparatuses and belong to one of the management groups are in the first cache memory, begins writing onto the disk apparatuses the data that belong to the one of the management groups, remaining in the first cache memory and scheduled to be written.

Another embodiment of the present invention relates to a destaging method for a storage apparatus system comprising a disk control apparatus that functions as a data storage unit and is provided with disk apparatuses and a first cache memory to store temporarily input/output data to and from the disk apparatuses, and at least one information processing apparatus that is connected to the disk control apparatus and provided with a second cache memory that temporarily stores data read from the disk control apparatus; the method comprises a first step, in which upon an interruption of the functions of the disk control apparatus as the disk storage unit for the information processing apparatus, the information processing apparatus transfers to the first cache memory data that is not reflected on the disk apparatuses and that is currently stored in the second cache memory; and a second step, in which the disk control apparatus manages data to be stored on the disk apparatuses by dividing the data into a plurality of groups and, when all of the data not reflected on the disk apparatuses and that belong to one group remaining in the second cache memory have been transferred to the first cache memory, begins writing onto the disk apparatuses the data not reflected on the disk apparatuses and that belong to the group remaining in the first cache memory.

Features and advantages of the present invention in addition to those described above shall become apparent from the following detailed description taken in conjunction with the accompanying drawings.

BRIEF DESCRIPTION OF THE DRAWINGS

Refer to the following description and the attached drawings for a more complete understanding of the present invention and its merits.

FIG. 2 shows a flushable table according to the first embodiment.

FIG. 3 shows a host-flushed LUN table according to the first embodiment.

DETAILED DESCRIPTION OF THE PREFERRED EMBODIMENT

At least the following shall become apparent from the description of the present specification and the accompanying drawings:

First Embodiment

Figure 1:
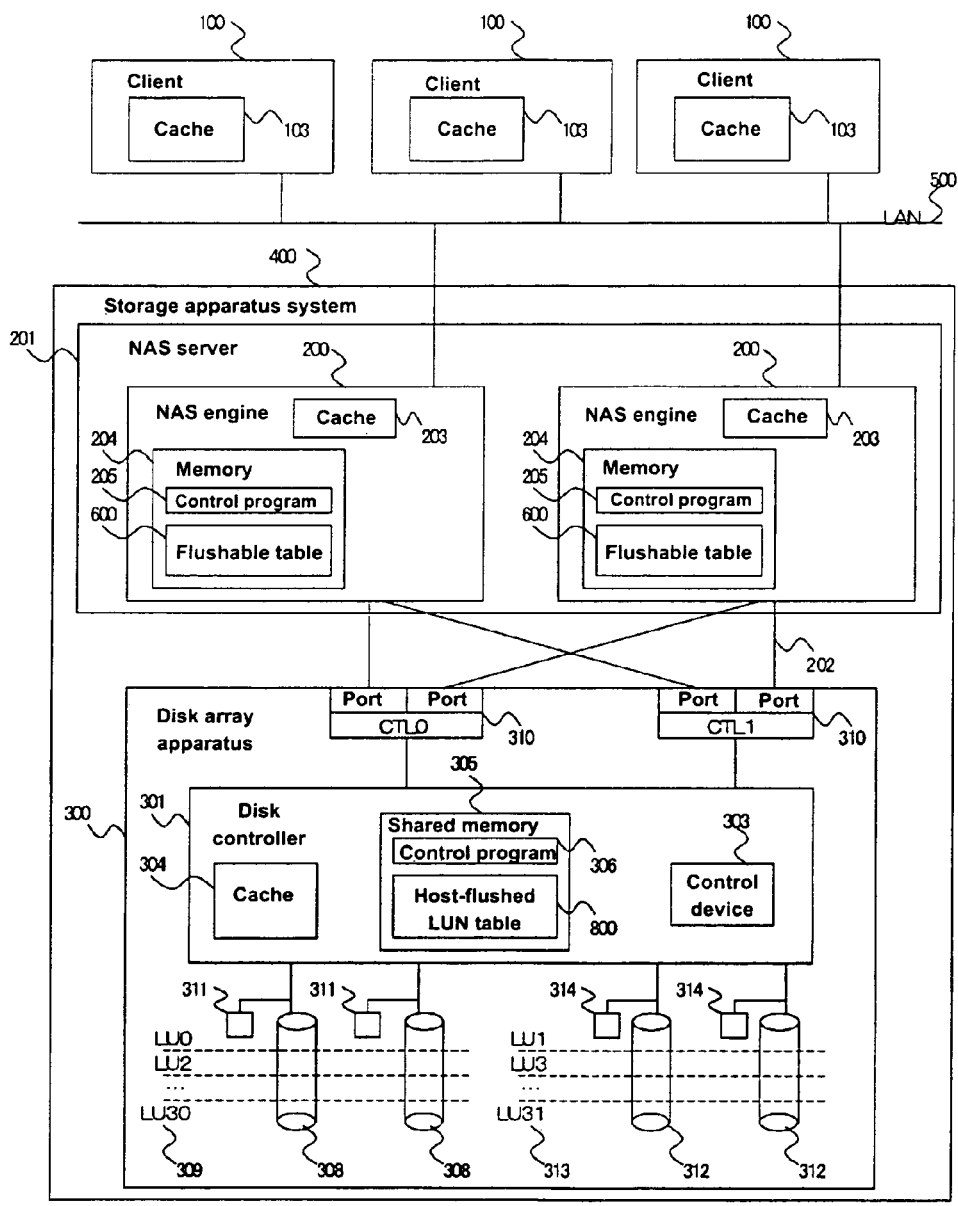
FIG. 1 is a block diagram of a computer system in accordance with a first embodiment of the present invention.

FIG. 1 schematically shows a block diagram of a computer system in accordance with a first embodiment of the present invention.

In this embodiment, three client computers 100 are connected to a LAN (Local Area Network) 500. The client computers 100 can communicate information with each other via the LAN 500. The LAN 500 is also connected to a storage apparatus system 400. Each of the client computers 100 accesses the storage apparatus system 400 via the LAN 500 and reads and writes data to and from the storage apparatus 400. Data that has been read from the storage apparatus system 400 is temporarily stored in a cache memory (hereinafter called "cache") 103. The cache 103 is managed according to the write-back method. For this reason, data processed in the computer 100 and scheduled to be written onto the storage apparatus system 400 remains in the cache 103 as dirty data until it is released from the cache 103.

Although there are three client computers 100 connected to the LAN 500 in the first embodiment, the number of client computers 100 can be any number. Further, the LAN 500 can be the Internet or an intra-company dedicated LAN. It can also be a SAN (Storage Area Network).

The storage apparatus system 400 is provided with a NAS (Network-Attached Storage) server 201 and a disk array apparatus 300. The NAS server 201 is a server to realize sharing of files among client computers 100 that are connected to a network such as the LAN 500. Inside the NAS server 201 are two NAS engines 200. Of the two NAS engines 200, one is a backup.

The NAS engines 200 are connected to the disk array apparatus 300 via a network 202. Each of the NAS engines 200 is provided with a cache 203 to store temporarily data read from the disk array apparatus 300. A memory 204 in each of the NAS engines 200 stores a control program 205 and a flushable table 600 to provide file services. The caches 203 are managed according to the write-back method. When there is a request to read data from one of the client computers 100 and if the requested data is in one of the caches 203, the corresponding NAS engine 200 sends the data in the cache 203 to the client computer 100 without having to access the disk array apparatus 300. Similarly, when there is a request to write data from one of the client computers 100, one of the NAS engines 200 writes the data in its cache 203 without having to access the disk array apparatus 300.

Upon receiving a data input or output request from one of the NAS engines 200, the disk array apparatus 300 reads or writes data. Input and output of data takes place via one of ports 310. A disk controller 301 of the disk array apparatus 300 has a cache 304, a shared memory 305 and a control device 303. The cache 304 temporarily stores data read from physical disks 308 and 312, on which data are physically recorded. The cache 304 is managed according to the write-back method. The shared memory 305 stores a control program 306 and a host-flushed LUN table 800. Upon receiving an instruction from one of the NAS engines 200, the control device 303 updates the host-flushed LUN table 800 in the shared memory 305.

The physical disks 308 and 312 store data. In the first embodiment, a plurality of physical disks 308 and 312 is treated as one unit to form a RAID (Redundant Array of Independent Disks). The storage region of each of the physical disks 308 and 312 is managed in divisions of predetermined management groups. In the first embodiment, the physical disks 308 and 312 are divided into 32 logical volumes (LU) 309 and 313.

An indicator lamp 311 or 314 is provided for each of the physical disks 308 and 312, respectively, and turns on whenever the corresponding physical disk 308 or 312 is accessed.

The management groups do not have to be logical volumes. For example, RAID groups can be the management groups. Furthermore, the size of every management group does not have to be the same. Moreover, units of management groups may be determined to be logical volumes in advance as in the first embodiment, or they may be changed later. For example, the units of management groups can be changed by connecting a management computer to the disk array apparatus 300 and changing setting files of the disk array apparatus 300 from the management computer.

The NAS server 201 and the disk array apparatus 300 can be structured in a unitary fashion and contained in one housing, or they can be in separate housings. The network 202 that connects the NAS server 201 with the disk array apparatus 300 can be a SAN with a plurality of disk array apparatuses connected. The communications interface can be Fibre Channel or SCSI (Small Computer Systems Interface).

Next, a flushable table according to the first embodiment shown in FIG. 2 will be described.

A flushable table 600 is stored in each of the memories 204 of the NAS engines 200. As described earlier, the NAS server 201 is a server to realize sharing of files among client computers 100 that are connected to a network such as the LAN 500. For this reason, each of the NAS engines 200 uses the flushable table 600 to manage which logical volume 309 or 313 the data read by each of the client computers 100 from the storage apparatus system 400 belongs to. When one of the NAS engines 200 flushes the corresponding cache 203, the flushable table 600 is referred to; this process will be described in detail later.

In FIG. 2, each mark "–" indicates that data has not been read out onto the client computer 100. When data is read out onto the applicable client computer 100, a mark "x" is entered in the cell for the logical volume (LU) the data belongs to. Upon receiving a notice from the applicable client computer 100 that flushing of the corresponding cache 103 is completed, the NAS engine 200 changes the mark "x"

to a mark "◯" for the client computer 100. Accordingly, a cell with a mark "◯" indicates that the data has been read onto the applicable client computer 100 and that there is no dirty data in the cache 103 of the client computer 100. A mark "x" indicates that the data has been read onto the applicable client computer 100 and that there is still dirty data in the cache 103 of the client computer 100.

Consequently, if there is no mark "x" for any of the client computers 100 in a column for a certain logical volume (LU), this indicates that data stored in all caches of upper hierarchy are ready. In FIG. 2, LU0 is one such column, for example. However, due to the fact that flushing from a client computer B has not been completed, FIG. 2 indicates that not all data stored in all caches of upper hierarchy are ready in LU1, LU30 and LU31. LU2 is not in use by any of the client computers 100.

Next, FIG. 3 shows a host-flushed LUN table according to the first embodiment.

The host-flushed LUN table 800 is stored in a shared memory 305 of the disk controller 301. When one of the NAS engines 200 refers to the flushable table 600 and flushes from the corresponding cache 203 data that belong to a logical volume that can be flushed, the data are stored in the cache 304 of the disk controller 300. The host-flushed LUN table 800 is used to notify to the disk controller 301 the number assigned to the logical volume flushed by the NAS engine 200. The disk controller 301 refers to the host-flushed LUN table 800 and, upon determining that the data in the cache 304 that belong to the logical volume notified could be destaged to the physical disks 309 and/or 312, begins writing the data onto the physical disks 309 and/or 312.

"1" or "0" is written for each logical volume in the host-flushed LUN table 800. Logical volumes for which "1" is written indicate that flushing of the cache 203 of the corresponding NAS engine 200 has been completed. Logical volumes for which "0" is written indicate that flushing of the cache 203 of the corresponding NAS engine 200 has not been completed.

Next, the flow of a flush processing of the cache in the system according to the first embodiment will be described. After being transferred to the cache 203 of one of the NAS engines 200 and the cache 304 of the disk controller 301, data stored in the cache 103 of one of the client computers 100 is written onto the physical disks 308 and/or 312.

First, a flowchart indicating a flush processing of cache data in the client computer 100 shown in FIG. 4 will be described.

When the client computer 100 shuts down, for example, its OS (operating system) begins a flush processing of dirty data stored in the corresponding cache 103 (S4000). The dirty data is transferred to the cache 203 of one of the NAS engines 200 via the LAN 500. When the flush processing is completed for all dirty data (S4001), the client computer 100 sends a flush completion notice to the NAS engine 200 and terminates the processing (S4002).

The flush processing of the client computer 100 can be set to take place not only when the client computer 100 shuts down, but also when backing up data stored in the storage apparatus system 400, for example. It can also be set to take place when an interruption of data storage function of the disk controller 300 occurs and when the storage apparatus system 400 shuts down. In the latter case, the flush processing of the client computer 100 is begun upon receiving a request to do so from the storage apparatus system 400.

Figure 5:
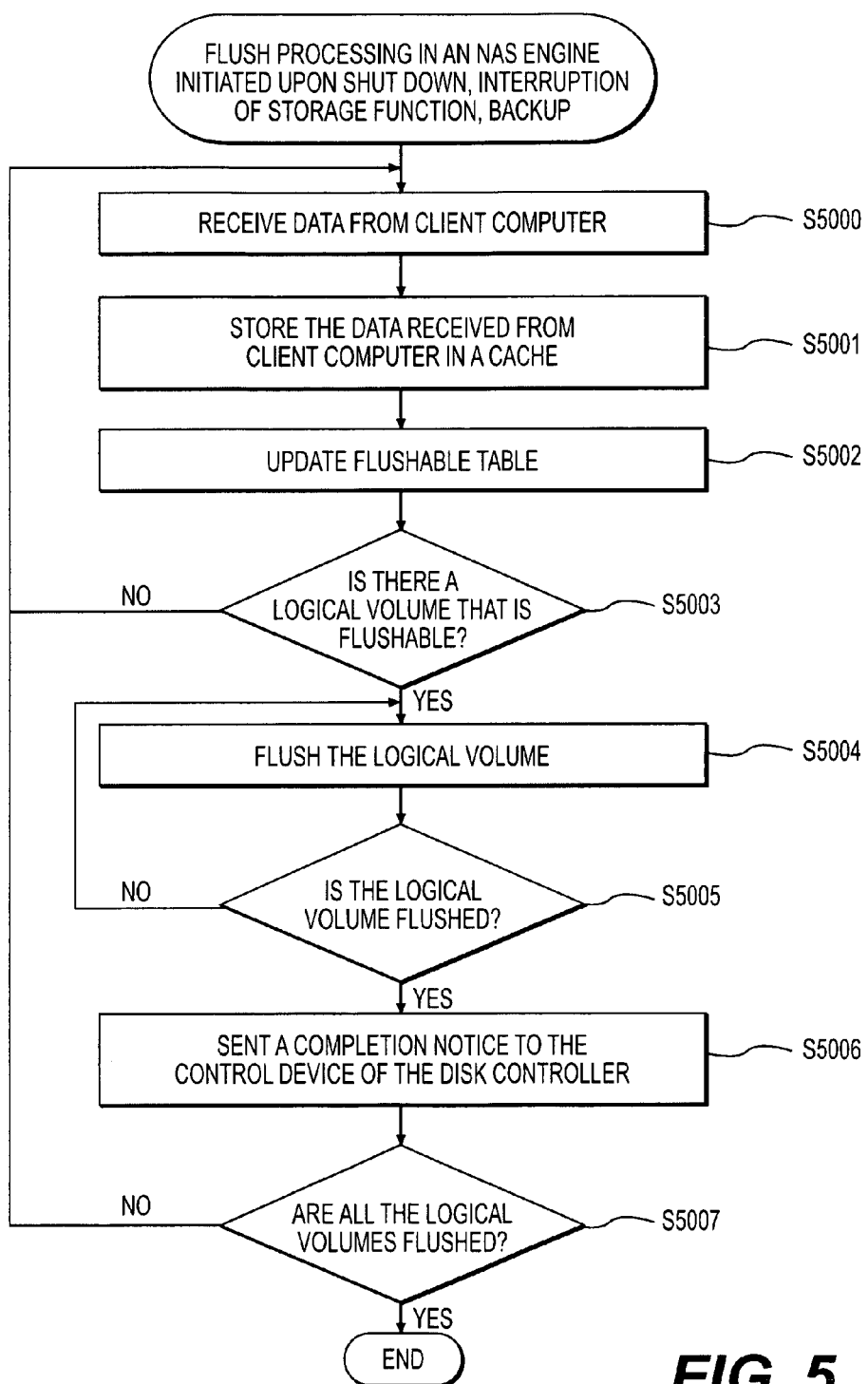
FIG. 5 shows a flowchart indicating a flush processing of cache data in an NAS server according to the first embodiment.

Next, a flowchart indicating a flush processing of cache data in a NAS engine according to the first embodiment shown in FIG. 5 will be described.

First, the NAS engine 200 stores in its cache 203 data received from the client computer 100 (S5000, S5001). Next, upon receiving the flush completion notice sent by the client computer 100 in S4002, the NAS engine 200 updates the flushable table 600 (S5002). Updating involves changing markings "x" to marks "◯" in the row for the applicable client computer 100 in the flushable table 600. For example, when a flush completion notice is received from a client computer B in FIG. 2, the marks "x" in LU1, LU30 and LU31 cells in the row for the client computer B are changed to marks "◯".

If it is determined as a result of updating that flushing has been completed for all client computers with regard to data in a certain logical volume, i.e., if there is a logical volume with no mark "x" in FIG. 2, the transfer of the data in the logical volume from the cache 203 to the cache 304 of the disk controller 301 begins (S5003, S5004). If there is no logical volume that can be flushed although the flushable table 600 was updated in S5002, the NAS engine 200 returns to S5000 and receives data from a different client computer 100.

When the transfer of data to the cache 304 of the disk controller 301 is completed (S5005), a completion notice is sent to the control device 303 of the disk controller 301 (S5006). When flushing to the cache 304 of the disk controller 301 is completed for data in all logical volumes, the processing is terminated (S5007).

Figure 6:
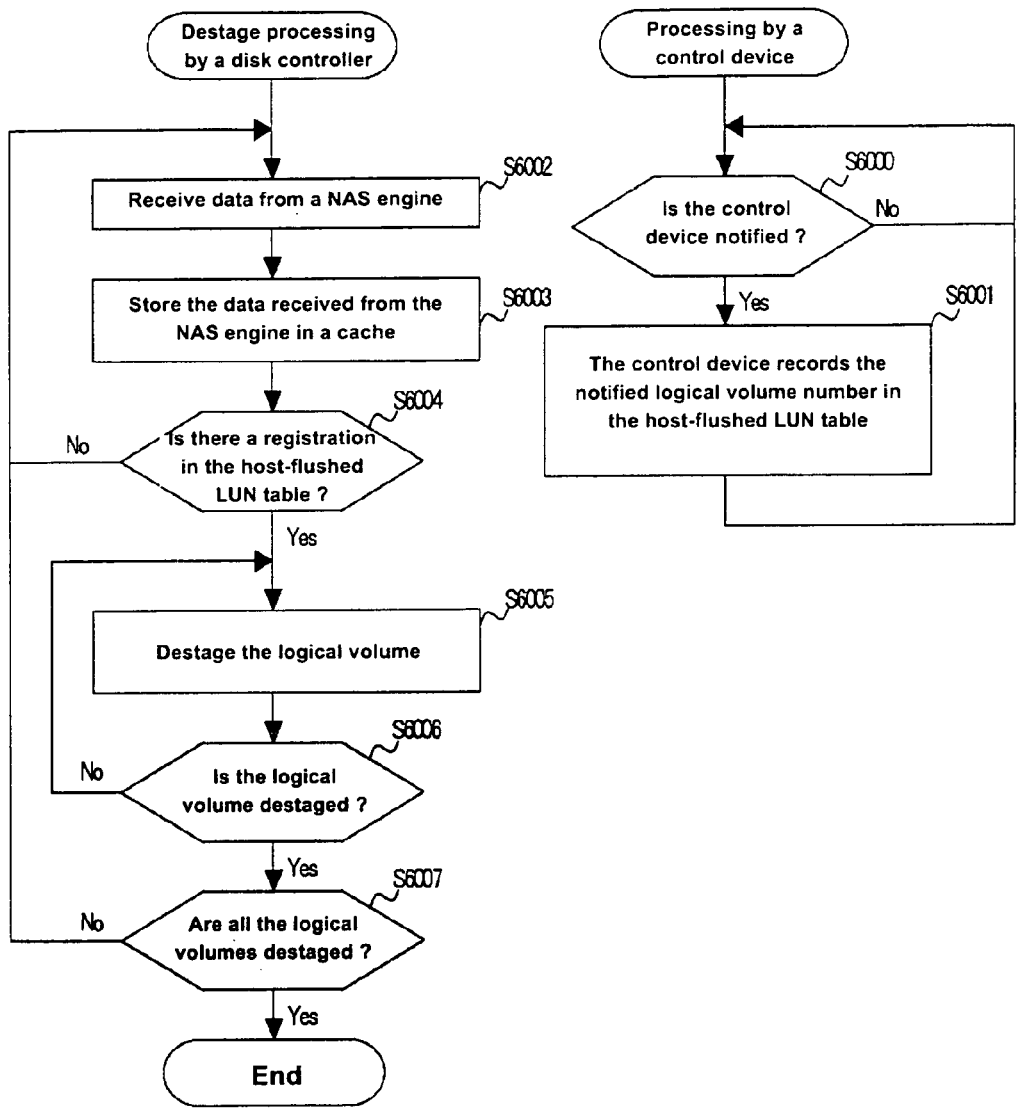
FIG. 6 shows a flowchart indicating a destaging processing of cache data in a disk array apparatus according to the first embodiment.

Next, a flowchart indicating a destaging processing of cache data by a disk controller 301 according to the first embodiment shown in FIG. 6 will be described.

First, the control device 303 of the disk controller 301 waits for the data transfer completion notice to arrive from the NAS engine 200 (S6000). Upon receiving the completion notice, the control device 303 records "1" in the position for the applicable logical volume number in the host-flushed LUN table 800 created in the shared memory 305 (S6001).

In the meantime, the disk controller 301 stores in the cache 304 the data sent from the NAS engine 200 (S6002, S6003). If, upon referring to the host-flushed LUN table 800, the disk controller 301 finds a logical volume with "1" recorded (S6004), it begins to write the data that belong to the logical volume onto the physical disks 308 and/or 312 (S6005). This step is repeated until data in all logical volumes are destaged to the physical disks 308 and/or 312 (S6007).

The physical disks 308 and 312 are managed in divisions of logical volumes as described earlier, and the indicator lamps 311 and/or 314 provided for the physical disks 308 and/or 312 that make up the applicable logical volume turn on while data are written onto the physical disks 308 and/or 312 in S6005. For example, while data are written to a logical volume 2 (LU2), a plurality of indicator lamps 311 corresponding to a plurality of physical disks 308 that make up the logical volume 2 turn on simultaneously.

By flushing caches according to the first embodiment as described, there is no need to wait for data stored in all caches in upper hierarchy to be ready; instead, once those data that belong to a certain logical volume are ready, destaging the data can be begun. As a result, destaging a cache memory can be performed in shorter time than conventionally.

Second Embodiment

Figure 7:
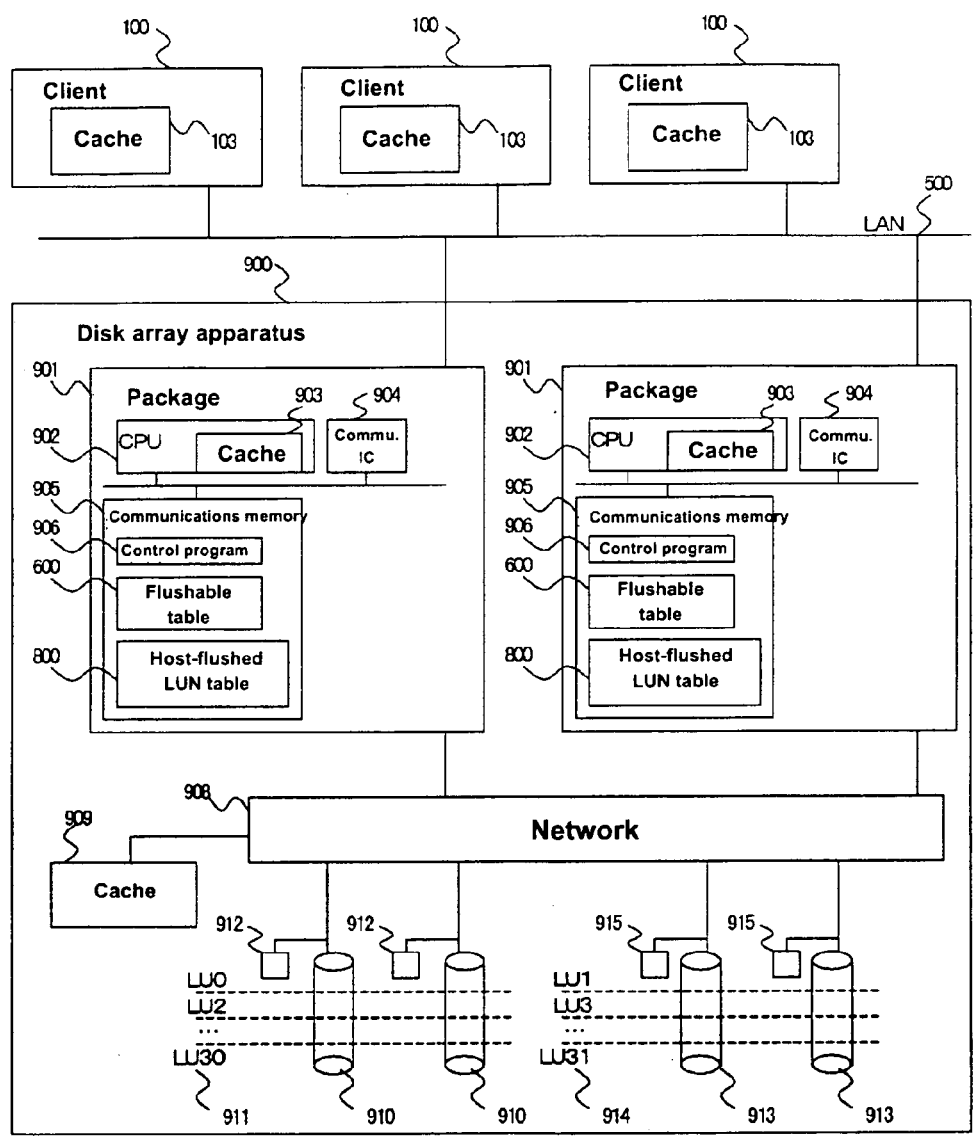
FIG. 7 shows a block diagram of a computer system in accordance with a second embodiment of the present invention.

Next, a computer system in accordance with a second embodiment of the present invention will be described with reference to a block diagram shown in FIG. 7.

As in the first embodiment, three client computers 100 are connected to a LAN (Local Area Network) 500. The client computers 100 can communicate information with each other via the LAN 500. The LAN 500 also is connected to a disk array apparatus 900. Each of the client computers 100 accesses the disk array apparatus 900 via the LAN 500 and writes and reads data to and from the disk array apparatus 900. Data that has been read from the disk array apparatus 900 are temporarily stored in a cache memory 103. Like the caches 103 according to the first embodiment, the caches 103 in the present embodiment are managed according to the write-back method. For this reason, data processed in the client computer 100 and scheduled to be written onto the disk array apparatus 900 remains in the cache 103 as dirty data until it is released from the cache 103.

The number of client computers 100 can be any number in the second embodiment as in the first embodiment. Further, the LAN 500 can be the Internet or an intracompany dedicated LAN. It can also be a SAN.

The disk array apparatus 900 is provided with packages 901. Each of the packages 901 communicates with the client computers 100 and has a function to provide data requested by the client computers 100. Of the two packages 901, one is a backup.

Each of the packages 901 is provided with a CPU 902, a communications IC 904 and a communications memory 905.

Each CPU 902 is provided internally with a cache 903 and controls the corresponding package 901. Each communications IC 904 controls communication of data in a cache 909 provided on a network 908. Each communications memory 905 can be accessed from both the corresponding CPU 902 and the corresponding communications IC 904 and stores a control program 905, a flushable table 600 and a host-flushed LUN table 800.

The network 908 to which the packages 901 are connected also has the cache 909 and physical disks 910 and 913 connected to it. The cache 909 temporarily stores data that the packages 901 read from the physical disks 910 and 913. The cache 909 is managed according to the write-back method.

The physical disks 910 and 913 store data. In the second embodiment, a plurality of physical disks 910 and 913 is treated as one unit to form a RAID. The storage region of each of the physical disks 910 and 913 is managed in divisions of predetermined management groups. In the second embodiment, the physical disks 910 and 913 are divided into 32 logical volumes (LU) 911 and 914.

An indicator lamp 912 or 915 is provided for each of the physical disks 910 and 913, respectively, and turns on whenever the corresponding physical disk 910 or 913 is accessed.

As in the first embodiment, the management groups do not have to be logical volumes. For example, RAID groups can be the management groups. Furthermore, the size of every management group does not have to be the same. Moreover, units of management groups may be determined to be logical volumes in advance as in the second embodiment, or they may be changed later. For example, the units of management groups can be changed by connecting a management computer to the disk array apparatus 900 and changing setting files of the disk array apparatus 900 from the management computer.

Figure 8:
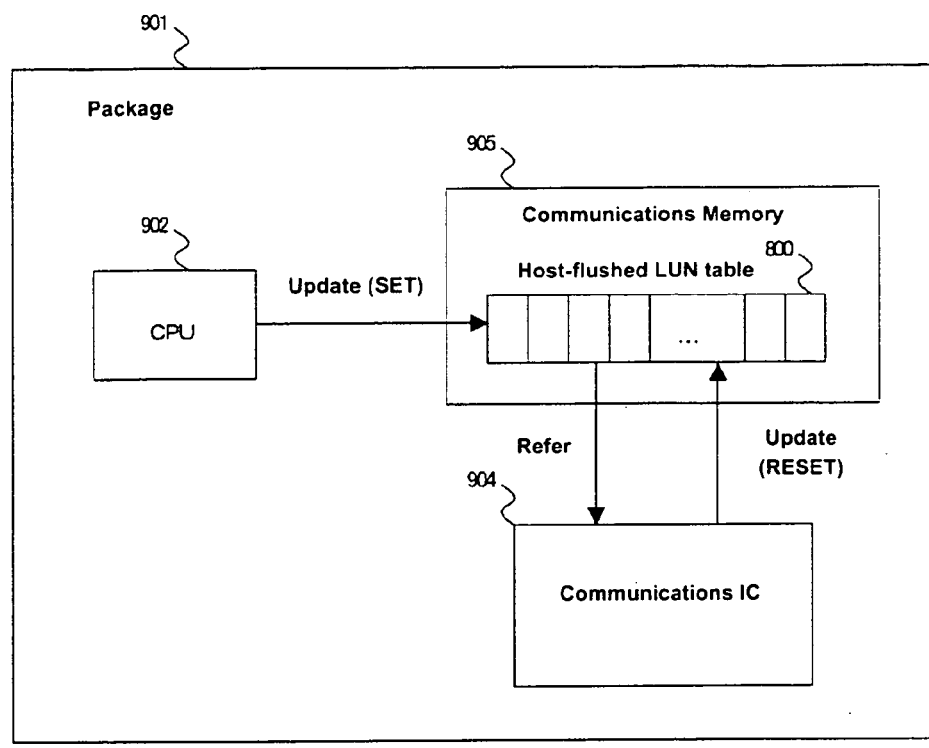
FIG. 8 shows a block diagram indicating access to a host-flushed LUN table in a shared memory according to the second embodiment.

Next, FIG. 8 shows a block diagram indicating access to the host-flushed LUN table 800 in the communications memory 905 according to the second embodiment.

One of the CPUs 902 stores in its cache 903 the data that are transferred from the caches 103 of the client computers 100, while also monitoring through the flushable table 600 for data that belong to a logical volume that can be flushed to the cache 909 to be ready. When it is determine that data that belong to a certain logical volume can be flushed, the CPU 902 transfers to the cache 909 data that belong to the logical volume. When the transfer is completed, the CPU 902 writes "1" in the position for the logical volume in the host-flushed LUN table 800 in the corresponding communications memory 905.

In the meantime, the communications IC 904 constantly monitors the host-flushed LUN table 800 in the corresponding communications memory 905 and when it recognizes that "1" has been written by the CPU 902, it begins to write onto the physical disks 910 and/or 913 the data that belong to the logical volume and that have been written in the cache 909. When writing the data is completed, the communications IC 904 returns the position for the logical volume in the host-flushed LUN table 800 to "0."

Through the above, it becomes possible for the CPU 902 and the communications IC 904 to be linked to write the data in the cache 909 onto the physical disks 910 and/or 913.

Next, the flow of a flush processing of the cache in the system according to the second embodiment will be described. After being transferred to the cache 903 of the CPU 902 and to the cache 909 on the network 908, data stored in the cache 103 of one of the client computers 100 is written onto the physical disks 910 and/or 913.

Figure 4:
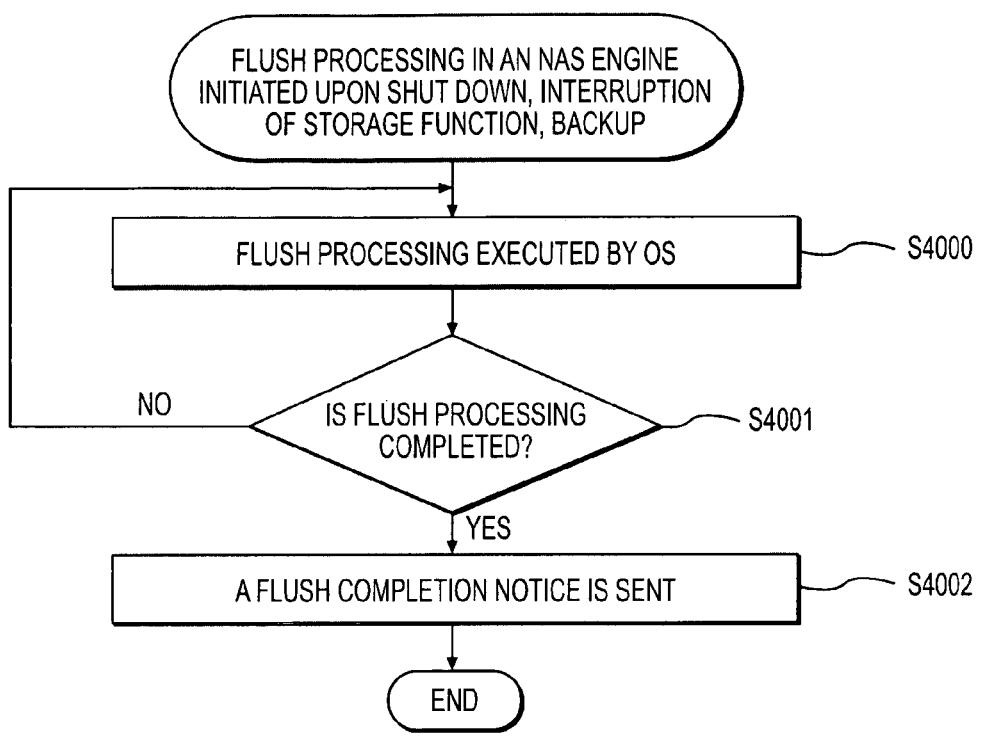
FIG. 4 shows a flowchart indicating a flush processing of cache data in a client computer according to the first embodiment.

The flush processing of cache data in the client computer 100 is the same as the flush processing according to the first embodiment (see FIG. 4).

Figure 9:
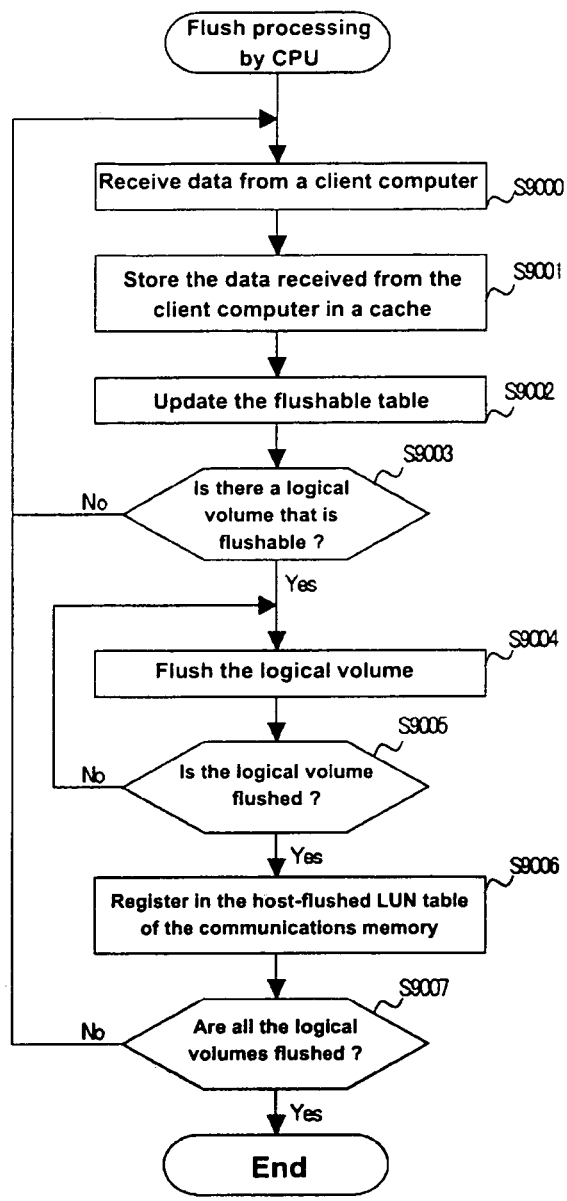
FIG. 9 shows a flowchart indicating a flush processing by a CPU of a disk array apparatus according to the second embodiment.

A flush processing by the CPU 902 will be described with reference to a flowchart shown in FIG. 9.

First, one of the CPUs 902 stores in its cache 903 data received from one of the client computers 100 (S9000, S9001). Next, upon receiving the flush completion notice sent by the client computer 100 in S4002, the CPU 902 updates the flushable table 600 (S9002). Updating is the same as described in the first embodiment.

If it is determined as a result of updating that flushing has been completed for all client computers 100 with regard to data in a certain logical volume, the transfer of the data in the logical volume from the cache 903 to the cache 909 on the network 908 begins (S9003, S9004). If there is no logical volume that can be flushed although the flushable table 600 was updated in S9002, the CPU 902 returns to S9000 and receives data from a different client computer 100.

When the transfer of data that belong to a certain logical volume to the cache 909 is completed (S9005), the CPU 902 writes "1" in the position for the logical volume in the host-flushed LUN table 800 of the communications memory 905 (S9006). When flushing to the cache 909 on the network 908 is completed for data in all logical volumes, the processing is terminated (S9007).

Figure 10:
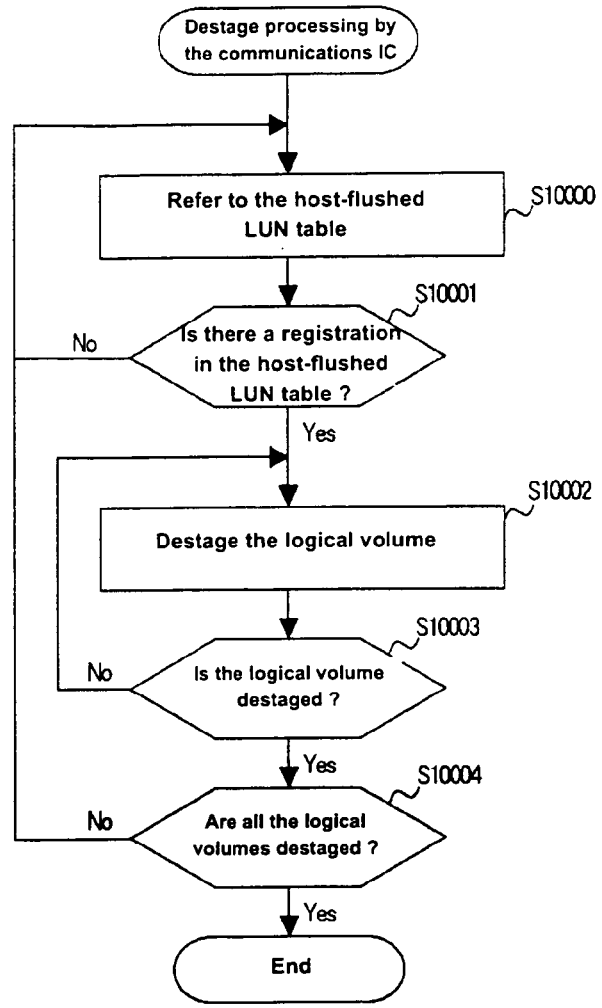
FIG. 10 shows a flowchart indicating a destaging processing by a communications IC of the disk array apparatus according to the second embodiment.

Next, a destaging processing by the communications IC 904 of the disk array apparatus 900 according to the second embodiment will be described with reference to a flowchart shown in FIG. 10.

First, the communications IC 904 refers to the host-flushed LUN table 800 created in the communications memory 905 and checks whether "1" is recorded in the position for a certain logical volume number (S10000). If there is a logical volume for which "1" is recorded in the host-flushed LUN table 800 (S10001), the communications IC 904 begins destaging the data that belong to the logical volume to the physical disks 910 and/or 913 (S10002). This step is repeated until data in all logical volumes are destaged to the physical disks 910 and/or 913 (S10004).

The physical disks 910 and 913 are managed in divisions of logical volumes as described earlier, and the indicator lamps 911 and/or 914 provided for the physical disks 910 and/or 913 that make up the applicable logical volume turn on while data are written onto the physical disks 910 and/or 913 in S10002. For example, while data are written to a logical volume 2 (LU2) in FIG. 7, a plurality of indicator lamps 911 corresponding to a plurality of physical disks 910 that make up the logical volume 2 turn on simultaneously.

There is no need to wait for data stored in all caches in upper hierarchy to be ready when flushing caches in the configuration according to the second embodiment as well; instead, once those data that belong to a certain logical volume are ready, destaging the data can be started. As a result, destaging a cache memory can be performed in shorter time than conventionally.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A destaging method for destaging a storage apparatus system including a plurality of disk storage devices for storing data, coupled to a disk control apparatus which controls said disk storage devices, a first cache memory, included in said disk control apparatus, that temporarily stores input/output data to and from the disk storage devices and a network attached storage (NAS) server which is connected to the disk control apparatus and has a second cache memory that temporarily stores data read from the disk control apparatus and is coupled to a client computer having a third cache memory that temporarily stores data read from the NAS server, the destaging method comprising:
   a first step of, when an interruption of a data storage function of the disk control apparatus for the NAS server occurs, receiving from the client computer data that is scheduled to be written onto the disk apparatus and currently stored in the third cache memory and storing the data in the second cache memory;
   a second step of transferring to the first cache memory data that is currently stored in the second cache memory and that is scheduled to be written onto the disk storage devices;
   a third step of managing data to be stored in the disk storage devices by dividing the data into a plurality of management groups; and
   a fourth step of, when all data that belongs to one of the management groups remaining in the second cache memory and scheduled to be written onto the disk storage devices are ready in the first cache memory, starting to write onto the disk storage devices the data that belongs to the one of the management groups, remaining in the first cache memory and scheduled to be written.

2. A destaging method according to claim 1, wherein the one of the management groups is correlated to at least one of logical volumes corresponding to a plurality of logical storage regions organized in storage regions provided by the disk storage devices.

3. A destaging method according to claim 2, wherein the NAS server includes a plurality of NAS engines that use a specified logical volume, and
   the destaging method further comprising the step of:
   issuing a notice from all of the NAS engines that use the specified logical volume that the transfer in the first step has been completed.

4. A storage apparatus system comprising:
   a disk apparatus, coupled to a disk control apparatus, for storing data,
   wherein said disk control apparatus controls said disk apparatus;
   a first cache memory, included in said disk control apparatus, that temporarily stores data to and from the disk apparatus; and
   a network attached storage (NAS) server which is connected to the disk control apparatus and has a second cache memory that temporarily stores data read from the disk control apparatus and is coupled to a client computer having a third cache memory that temporarily stores data read from the NAS server,
   wherein said NAS server receives from the client computer data that is scheduled to be written onto the disk apparatus and currently stored in the third cache memory and stores the data in the second cache memory, upon an interruption of a function of the disk control apparatus;
   wherein said NAS server begins to transfer to the first cache memory the data scheduled to be written onto the disk apparatus and is currently remaining in the second cache memory upon completion of transfer of data from third cache memory to second cache memory; and
   wherein said disk control apparatus manages data to be stored on the disk apparatus by dividing data into a plurality of management groups and, when all data that belongs to one of the management groups remaining in the second cache memory and scheduled to be written onto the disk apparatus are ready in the first cache memory, begins writing onto the disk apparatus the data that belongs to the one of the management groups, remaining in the first cache memory and scheduled to be written.

5. A storage apparatus system according to claim 4, wherein the disk control apparatus and the NAS server are contained in one housing.

* * * * *